UNITED STATES PATENT OFFICE.

RUDOLF KOETSCHAU, OF WALDHEIM, NEAR HANOVER, GERMANY, ASSIGNOR, BY MESNE ASSIGNMENTS, TO THE CHEMICAL FOUNDATION, INC., A CORPORATION OF DELAWARE.

PROCESS OF CONVERTING MINERAL OIL OF HIGH BOILING-POINTS INTO PRODUCTS HAVING LOWER BOILING-POINTS.

1,325,299.     Specification of Letters Patent.     Patented Dec. 16, 1919.

No Drawing.     Application filed March 19, 1914. Serial No. 825,916.

*To all whom it may concern:*

Be it known that I, RUDOLF KOETSCHAU, a subject of the Grand Duke of Saxe-Weimar, residing at 40 Brandensteinstrasse, Waldheim, near Hanover, Germany, have invented certain new and useful Improvements in Processes of Converting Mineral Oils of High Boiling-Points Into Products Having Lower Boiling-Points; and I do hereby declare the following to be a full, clear, and exact description of the invention.

The present invention is based upon the hitherto unknown fact, discovered by me, that an oily product, consisting of a double compound of aluminumhalid (such as $AlCl_3$) united to a hydrocarbon, possesses the property of decomposing mineral oil and its distillates, into products of lower boiling points, in a manner analogous to an unorganized ferment, thereby forming a continuous catalytic process, while the hydrocarbon-halogenaluminium compound itself is hardly changed at all. Thus by means of small quantities of this substance, at ordinary pressure, or at higher pressures, or at lower pressures, and at a relatively low temperature, say room temperature, or not above the boiling point of the oil being treated, it is possible to convert any desired quantity of mineral oil, or its distillates having high boiling points into substances resembling benzin.

The catalytic process by means of which this hydrocarbon-halogen-aluminium-compound acts as a splitting agent for compounds of the paraffin series, could not have been foreseen. One would rather have expected a synthesizing action upon mineral oil, in accordance with the Friedel-Craft reaction, than an analytical or splitting reaction. Moreover it was not to be expected that a hydrocarbon-halogenaluminium compound in the production of which petroleum hydrocarbons are used, would have the effect of catalytically splitting up petroleum hydrocarbons (which constitute its mother substance) in unlimited quantities. By this reaction it is possible to realize an application of great technical value.

(Throughout this specification it will be noted that the term "benzin" is used to apply to liquids produced from petroleum or its fractions, and consisting essentially of hydrocarbons of the aliphatic series, and the term "benzol" is employed to signify a carbocyclic compound $C_6H_6$; in order to prevent any confusion as to the terms employed.)

The following technical effects are particularly pointed out:—

The catalytic decomposition proceeds in a simple manner. The reaction proceeds in the absence of hydrochloric and equivalent acids, since we do not have to deal with halogen aluminium compounds alone (aluminium chlorid) but with particular organic compounds, namely the hydrocarbon addition product of aluminium halid. When free aluminium halid was used in the treatment of petroleum, the products consist chiefly of gases, with only a very small amount of light oils, most of which are unsaturated compounds, while on the contrary in accordance with the present invention, only small quantities of gases are formed, and the benzin produced, consists essentially of saturated hydrocarbons.

There is during the process, a continuous production of light oils of the boiling point of about 45 to 140° C., the products having a specific gravity at 15° C., about 7 to 75.

As compared with the well known cracking processes, the new process has many advantages, among which it is particularly pointed out that the oils produced in accordance with the present invention, have a pleasant odor as distinguished from the disagreeable odor of most of the cracked products. Furthermore it is not necessary to work under pressure (especially very high pressure) as in the case of the cracking process, but the new process can be carried out at atmospheric pressure, or in a partial vacuum, or at a pressure somewhat above atmospheric.

In working with the double compound of hydrocarbon and aluminium halid (such as aluminium chlorid) which materials may be obtained according to the Gustavson method, from saturated or unsaturated hydrocarbons, or from alkyl chlorids or in any other suitable manner, the reaction proceeds at atmospheric pressure, or at lower or higher pressures. Attention is called also to the fact, that the materials employed, either the oil or the catalyzer may be employed in solid form, for instance as absorbed by porous or similar masses having a high absorptive power (e. g. kieselguhr).

Example 1.

In a distilling boiler, provided with a column and with a return condenser, which latter may be maintained at any desired temperature, heat 1000 parts of mineral oil (for example petroleum having relatively high boiling point) with 50 parts of the double compound of hydrocarbon and aluminium chlorid, to the temperature at which boiling begins, in such a way, that the light oils will distil off continuously at about 110° C. The materials having the higher boiling points flow back into the still, until the entire mixture is gradually decomposed. From time to time small quantities of the catalyzer may be added to enliven the reaction, or to hasten the process. The benzin obtained in this manner contains traces of hydrochloric acid which can be removed by the addition of lime or similar material. The process may be made continuous, by adding more of the mineral oil as fast as the light oil is removed therefrom by distillation, and small quantities of the catalyzer may or may not be added to the mineral oil as the latter flows into the still.

Example 2.

The process above referred to may be modified by the use of diminished pressure (about 130 mm. absolute).

Example, 3.

The catalyzer, the double compound of hydrocarbon and aluminium chlorid, may be absorbed in kieselguhr or other solid material.

Example, 4.

In a distilling boiler, hot petroleum is allowed to drop upon an excess of the double compound of aluminium halid and hydrocarbon, which latter is maintained at a temperature of about 170° C., while the whole is stirred. Large quantities of substances resembling benzin will distil over continuously.

Example, 5.

The catalyzer may be employed to treat the gases or vapors of mineral oil, by conducting said vapors over or through a layer of the catalyzer, which in this case is preferably absorbed by porous materials e. g., kieselguhr, so that the light products formed, can thereafter be subjected to condensation, in order to recover the benzin.

The material to be decomposed can be carried as a flowing stream, directly through the apparatus in which the splitting agent is produced, which step simplifies the entire process. Another mode of simplifying the process, is by starting with aluminium itself, and during the progress of the reaction to introduce hydrochloric acid or other hydrogen halid, or halogen carrying or transferring material, to act upon said aluminium. The hydrogen halid (e. g. HCl) may be introduced in the form of a gas, if desired. In these cases, products of high boiling point which are formed as intermediate products, will be split into benzin, and the formation of gas takes place only to a limited extent. The use of aluminium and halogen vehicles or transferrers in connection with aromatic substances, has already been described (see Berichte 28, 1895, page 1135). However, there is this material difference, that in the Friedel-Craft's reactions, aromatic substances only were employed, and it appears wholly impossible to presuppose any action in the case of aliphatic substances alone, by means of a catalytic reaction.

Example, 6.

The catalyzer will first be produced, as above described.

In a suitable distilling boiler 500 kgs. of illuminating petroleum (kerosene) is heated to boiling, and 1% of pulverized aluminium chlorid is added, preferably with the addition of 1% benzol, in order to hasten the formation of the catalyzer. A small amount of the previously formed catalyzer may be added to the original petroleum if desired.

If, on account of the high molecular weight and high boiling point of the intermediate products, they decompose too slowly, and the speed of benzin formation is too low, additional quantities of aluminium chlorid and metallic aluminium may be added to the mass, in order to accelerate the reaction.

Example, 7.

In a distilling retort 1000 kgs. of gas oil are heated with a mixture of 10 kgs. of aluminium dust and 15 kgs. of mercuric chlorid ($HgCl_2$) which causes the formation of the catalyzer, which separates out in an oily form, and which leads to the formation of large quantities of benzin which distil over. In case the reaction proceeds too slowly after a time further quantities of the mixture of metallic aluminium and mercuric chlorid, may be added, which accelerates the decomposition of the intermediate products having high boiling points.

Example, 8.

1000 kgs. of gas oil are heated with 5% of aluminum powder, to a temperature corresponding to the boiling point of the oil, and a stream of dry hydrochloric acid gas is passed through said oil. After the formation of the catalytic agent has taken place, there follows a copious distilling over of products resembling benzin.

The quantity of benzin distilling over will be compensated for, by the addition of further quantities of gas oil, either continuously or intermittently and in this manner it is possible to keep the catalytic process in operation for days or weeks, without interruption.

It has furthermore been discovered that the splitting of mineral oils, and mineral oil fractions and residues, could be favorably influenced as to the speed of the reaction, by allowing chemical or physical or mechanical agents, to act together with the catalytic agent. As examples of chemical agents anhydrous chlorids such as chlorid of iron or chlorid of vanadium, or as an example of a physical agent, ultra violet light, or non-luminous electric discharges may be employed, or mechanical influences such as vigorous agitation, shaking or spraying, may be employed for accelerating the particular reaction.

*Example, 9.*

A catalyzer is produced by treating equal parts of aluminium chlorid and sublimed iron chlorid with mineral oil, or a distillate thereof, by the methods given above, or there may be added, while heating the mineral oil with the double compound of hydrocarbon and aluminium halid, a suitable chlorid from time to time, such as iron or vanadium chlorid. In a short time considerable quantities of benzin distil over. The iron or vanadium chlorids appear to have an accelerating or promoting action on the catalyzer.

*Example 10.*

A suspension of mineral oil and catalyzer are caused to flow through a quartz tube which is illuminated with ultraviolet light, for example by means of a mercury vapor lamp, the rate of flow, temperature, and other factors being regulated. In this manner substances resembling benzin are produced, and a satisfactory yield is obtained.

*Example, 11.*

Petroleum to which is added 5% of the double compound of hydrocarbon and aluminium halid is sprayed by means of a nozzle against the metal surface heated to about 200° C., which heated surface is contained within a boiler from which the vapors are exhausted, for example under reduced pressure. In this case without any considerable formation of gas, we may obtain products having a low boiling point, suitable for use as fuel for motors. The metal surfaces may be heated in any convenient manner, such as by gas flames, oil flames, superheated steam or vapors, or electrical means, in any suitable manner.

The essential feature of this form of execution resides in the exclusion of the formation of material quantities of gas, although products resembling benzin are produced in a satisfactory quantity, and without much labor.

As above noted the reaction may be carried out in such a manner that almost a complete gasification of the oil takes place. This process is useful for some technical purposes. It has been found possible to convert the material principally into hydrocarbons of very low boiling point, say below 50° C., in other words principally gases, the process in this case being carried out in closed vessels under pressure (autoclaves). In this case we may heat the materials for a very long time, for example several days, in contact with the catalyzer, at temperatures up to 350° C. The extraordinary observation has also been made that temperatures of 150° C. are in most cases sufficient, even if heavy mineral oils of high boiling points are employed.

While in certain instances it is stated that the benzin distils off and is thereby removed from further action of the catalytic body, it will be noted that in other instances the benzin is allowed to remain in contact with the catalytic body for a considerable time, in which case the catalytic body breaks up considerable proportions of the benzin originally formed, thereby producing lighter (*e. g.* gaseous) products therefrom. The autoclaves in which the mineral oil is heated for several days, in contact with the catalyzer, up to a temperature of 150° C., show at the beginning of the process no pressure above atmospheric, but after twenty-four hours, the compressed gas in the upper part of the autoclave may be found to be under considerable pressure, and may be drawn off for use as a lighting or heating agent if so desired.

*Example, 12.*

100 kgs. of gas oil are heated with 10 kgs. of the catalytic body, containing 1% of free aluminium chlorid, for six days in an autoclave, by means of a steam coil, at a temperature of about 150° C. The pressure rises during the six days, to about 10 to 20 atmospheres. After the removal of the gas, the autoclave is again filled with gas oil, and is again heated with the catalyzer which continues to act. In this case also a bomb such as is used for storing compressed gases, could be employed.

*Example, 13.*

Proceed as in example 12, but employing the materials from which the catalyzer is produced, rather than the ready formed catalyzer, and while heating the mineral oil together with the materials from which the catalyzer is to be produced, in order that the latter shall be formed in the autoclaves, which process may be further modified by aiding the same by means of chemical or physical agents, such as above referred to. In this mode of execution free aluminium halid may be employed, since losses of this by sublimation can readily be avoided by the use of closed vessels, in order that the catalyzer itself can readily be produced.

I claim as my invention:

1. A process of converting oils of relatively high boiling points, into products of lower boiling points, which comprises treating said oils, with a catalyzer, comprising the hydrocarbon addition products of a halogen aluminium compound.

2. A process which comprises heating hydrocarbon materials of relatively high boiling points with a hydrocarbon derivative of an aluminium halid compound, and distilling off products of lower boiling point than the starting material.

3. In the process of treating hydrocarbon oil with a catalyzer comprising a halogen aluminium hydrocarbon addition product, the step of allowing an inflow of fresh material, in order to make the process continuous.

4. A process which comprises treating mineral oil or its distillates having high boiling points with a hydrocarbon addition product of an aluminium halid as a catalyzer, said catalyzer being absorbed by a porous material, and passing a current of the oil to be treated in contact with said catalyzer.

5. In the process of treating hydrocarbon oils with a double compound of a hydrocarbon and aluminium halid as a catalytic agent, the step of forming said catalytic agent within the body of oil under treatment.

6. In the treatment of mineral oils or their distillates with a catalyzer, the step of increasing the rate of reaction, which comprises subjecting said materials during the contact of the same with the catalyzer, to the action of chemical and physical agents, capable of increasing the rate of the catalytic reaction.

7. In the treatment of oils with a catalyzer comprising a hydrocarbon addition product of an aluminium halogen compound, the step of maintaining said catalyzer and said oily body in contact for a long time in closed vessels, in order to allow said reaction to proceed as far as may be desired.

8. The process of converting petroleum oils of relatively high boiling points into hydrocarbon oils of lower boiling points, which comprises establishing and maintaining a boiling mass of such petroleum oils, in the presence of an aluminous material, leading a current of chlorin-containing gas into contact with said material, under conditions suitable for the formation of a double compound of aluminum chlorid and hydrocarbon, discontinuing the introduction of the chlorin-containing gas when such double compound has been produced, and distilling hydrocarbon oils of relatively low boiling points from the mass.

In testimony whereof I have signed my name to this specification, in the presence of two subscribing witnesses.

RUDOLF KOETSCHAU.

Witnesses:
OTTO FHLAN,
WALTHER STEINCKE.